United States Patent [19]

Hart

[11] Patent Number: 4,927,237

[45] Date of Patent: May 22, 1990

[54] UNIVERSAL NIGHT VISION GOGGLE ADAPTER

[75] Inventor: Richard T. Hart, Garland, Tex.

[73] Assignee: Varo, Inc., Garland, Tex.

[21] Appl. No.: 203,496

[22] Filed: Jun. 7, 1988

[51] Int. Cl.⁵ .............................................. G02B 7/02
[52] U.S. Cl. ................................... 350/319; 350/252; 350/257
[58] Field of Search ............... 350/319, 320, 321, 318, 350/245, 246, 247, 252, 251, 255, 257; 24/456, 629, 630; 248/670, 245, 323; 403/DIG. 1

[56] References Cited

U.S. PATENT DOCUMENTS 3,652,152  3/1972  Thursby, Jr. .................. 350/245
4,700,437  10/1987  Hoshiro ........................ 24/456

Primary Examiner—Bruce Y. Arnold
Assistant Examiner—Loha Ben
Attorney, Agent, or Firm—Baker, Mills & Glast

[57] ABSTRACT

A universal night vision goggle adapter (38) is provided for mounting a pair of night vision goggles (40) to a Special Purpose Test Set (10). The adapter (38) comprises slidably adjustable clamps (61 and 62) which are adjusted by a rotating rod (46). The rod (46) is rotationally supported by a bearing housing (44) which is in-turn fixed to a platform (42). The rod (46) is threadably attached at one end to a first bar (48) and threadably attached at another end to a second bar (50). The first and second bars (48 and 50) are fixed to the adjustable clamps (61 and 62) in such a fashion that as the rod (46) is rotated, the bars (48 and 50) are moved closer together or farther apart to adjust the clamps (61 and 62).

17 Claims, 2 Drawing Sheets

UNIVERSAL NIGHT VISION GOGGLE ADAPTER

TECHNICAL FIELD OF THE INVENTION

This invention relates in general to optical devices, and in particular to a universal night vision goggle adapter.

BACKGROUND OF THE INVENTION

Night vision goggles, as well as other optical devices, often need to be fixed or held onto test equipment to conduct tests and make appropriate adjustments. Night vision goggles, which are adapted for use by the military, are field tested on a device known as a Special Purpose Test Set. The Special Purpose Test Set is a portable test set, and is used in the field to check resolution, collimation and other optical parameters of the night vision goggle.

As a result of the manufacture of various generations of night vision goggles as well as different manufacturers thereof, the Special Purpose Test Set cannot conveniently grasp or hold all currently available models of night vision goggles. The Test Set has a pair of receptacles into which the binocular night vision goggles are inserted for testing, and since the various types of night vision goggles are dimensionally different, the receptacles require bushing adapters to accept the various goggles.

The adapters typically comprise bushings that fit around the inserted portion of the night vision goggles and have an outside diameter the same as the inside diameter of the Test Set receptacles. Due to the various versions of night vision goggles, a different bushing is required to adapt each goggle version to the Test Set. All the bushings must be carried along with the Test Set to be able to test any of the various pairs of night vision goggles that are currently available. Therefore, it is necessary to either carry all the bushings in bags which are carried with the Test Set equipment, or tether each bushing to the receptacles in order to make them readily available. The bags and the individual bushings are easy to lose, while the use of tethers allows the bushings to become easily entangled and therefore adds undesireable clutter to the Test Set. Whichever method is chosen to store the bushings, confusion and loss of parts frequently occur. Thus, a need has arisen for a universal adapter to grasp all versions of night vision goggles to allow testing on the Special Purpose Test Set, and to eliminate the requirement of bushing adapters.

SUMMARY OF THE INVENTION

The present invention disclosed herein comprises a method and apparatus for universally adapting night vision goggles to a Special Purpose Test Set which substantially eliminates or reduces problems associated with prior adapters. The present invention allows the adaptation of the various sized night vision goggles to the Special Purpose Test Set without the need for adapter bushings.

In accordance with one aspect of the invention, disclosed is a universal optical device adapter for use with general purpose optical device test sets. First and second adjustable clamps are spaced apart a convenient distance to match the spacing between the lenses of a binocular optical device. An adjusting portion for cooperatively adjusting the clamps about a common axis is secured to a platform which positions and fixes the clamps to the optical test set.

In a further aspect of the present invention, each adjustable clamp comprises slidable engageable first second clamping portions which are generally C-shaped. As the clamping portions slidably engage, a generally oval-shaped opening is formed for holding the optical device. Integral with the C-shaped clamp portions are flanges for supporting the optical device so that the goggle is accurately positioned over the optical test equipment of the Test Set.

The adjusting portion comprises a bearing housing positioned between the clamps. A threaded rod passes therethrough on a transverse axis and is rotatably supported therein. The rod has right hand threads on one end and left hand threads on the other end and is threaded through two parallel bars, one on each end thereof. As the rod is rotated in the bearing housing, the threads cause the parallel bars to move, and thus move both of the clamps in unison.

A technical advantage of the present invention is that it eliminates the need for a plurality of various sized bushings to adapt different optical devices to a Test Set.

BRIEF DESCRIPTION OF THE DRAWINGS

For a more complete understanding of the present invention, and for further advantages thereof, reference is now made to the following Detailed Description taken in conjunction with the accompanying Drawings, in which:

FIG. 3b is a cross-sectional view along line 3b—3b of FIG. 3a;

DETAILED DESCRIPTION OF THE INVENTION

Figure 1:
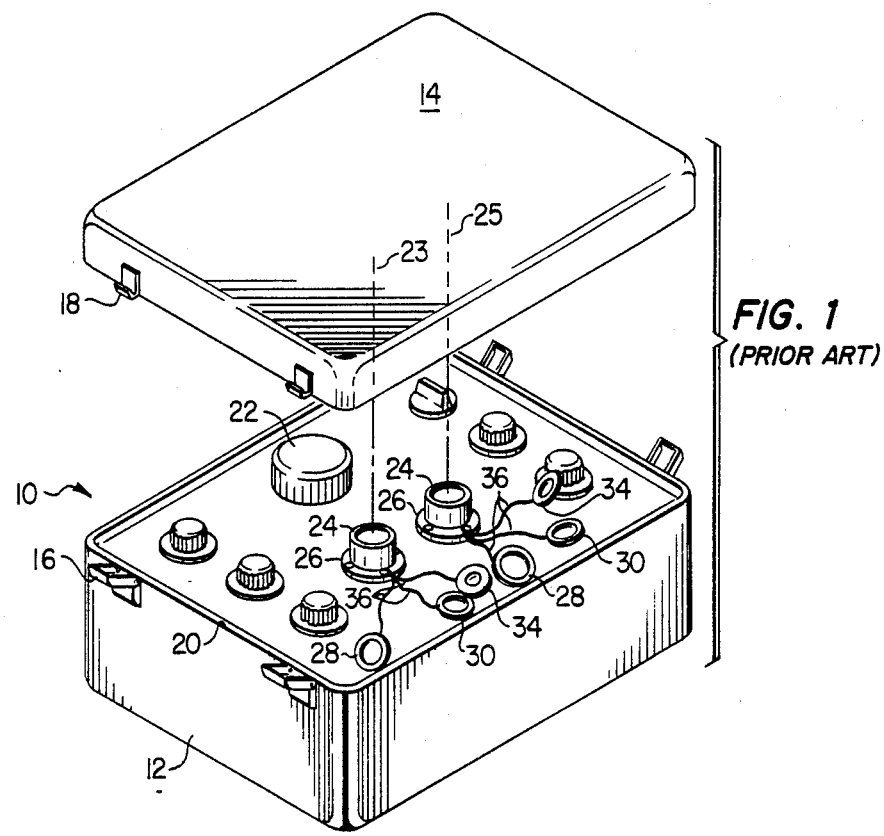
FIG. 1 is a perspective view of a Special Purpose Test Set with tethered bushings, constructed in accordance with the prior art.

In FIGS. 1 through 5, like items are identified by like and corresponding numerals for ease of reference. Referring to FIG. 1, shown is a portable Special Purpose Test Set 10 as typically utilized by the military to test night vision goggles. The Special Purpose Test Set 10 is designed to conduct tests for checking resolution, collimation and other optical parameters. The Test Set comprises a base 12 and a cover 14 which is attached to the base 12 by hingeable clamps 16 and clamp holders 18. A seal 20 may be provided around the perimeter of the base 12 to seal the lid 14 to the base 12.

Various tests on the Test Set 10 are performed utilizing manual controls, such as a filter knob 22, and others. A pair of collimation receptacles 24 are secured to the base 12 by respective bolt plates 26. The tubular parts of a binocular goggle are aligned along optical axis 23 and 25 and held fixed with respect to the collimation receptacles 24 so that the goggle can be tested. Optical axes 23 and 25 are perpendicular to the base 12 and pass through the center of collimation receptacles 24. For monocular devices, only a single receptacle would be utilized. Due to the various types of night vision goggles, as well as various versions of each type, the outside diameter of the tubular lens portion thereof varies, and thus makes it difficult to conveniently hold the goggle to the Test Set receptacles.

As a result of the variations in the outside diameter of the goggle lens portions, according to the prior art, adaptor bushings 28, 30 and 34 are provided. Bushings 28, 30 and 34 are each dimensioned at one end thereof to fit a particular goggle lens portion, and dimensioned of the other end with an outside diameter matching the inside diameter of the receptacles 24. A different bushing adapter must be provided for each different type of goggle device. In addition, the bushing adapters include an open end for insertion of the goggle, and thus cannot be clamped tightly to the goggle.

Due to the transportability of the Test Set 10, it is essential that the adapter bushings 28, 30 and 34 are maintained in a fashion that will prevent their loss. Typically, the bushings 28, 30 and 34 are tethered to the receptacles 24 by a line 36 which may comprise, for example, a wire or string. Alternatively, the bushings 28, 30 and 34 may be inserted into a carry-along pouch. Whichever method is chosen for carrying the bushings 28, 30 and 34, confusion of the operator and loss of the bushings 28, 30 and 34 frequently occur.

In operation under the prior art, a night vision goggle (either a binocular type or a monocular type) is fitted with the appropriate bushing. The night vision goggle is then inserted into the receptacles 24 along optical axes 23 and 25 and tests are conducted. It is an objective of the present invention to eliminate the plurality of bushings which may be lost.

Figure 2:
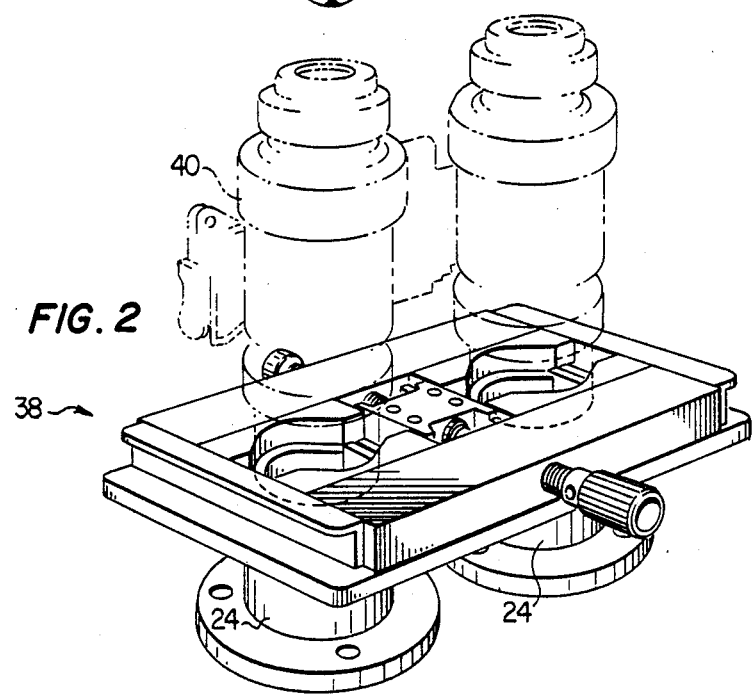
FIG. 2 is a perspective view of the universal adapter constructed in accordance with the present invention, including a binocular-type night vision goggle affixed thereto.

FIG. 2 is a perspective view of a universal adapter 38 constructed in accordance with the present invention. The universal adapter 38 is positioned over the collimation receptables 24 and secured thereto by any appropriate device such as fastening clips, not shown. A binocular pair of night vision goggles 40, as indicated by dashed lines, is secured within the universal adapter 38 in a manner as will be subsequently described in more detail. The adaptability of the universal adapter 38 can be realized by its ease of operation. A pair of adjustable size openings are provided to accommodate the various sized of goggle devices. A single manually adjustable knob is also provided for varying the size of the adapter openings, and for clamping the goggle therein. The universal adapter 38 of the invention thereby holds the goggle in a more positive manner, is easily and quickly adjustable to any of a number of goggle types and avoids the necessity of bushing adapters.

Figure 3A:
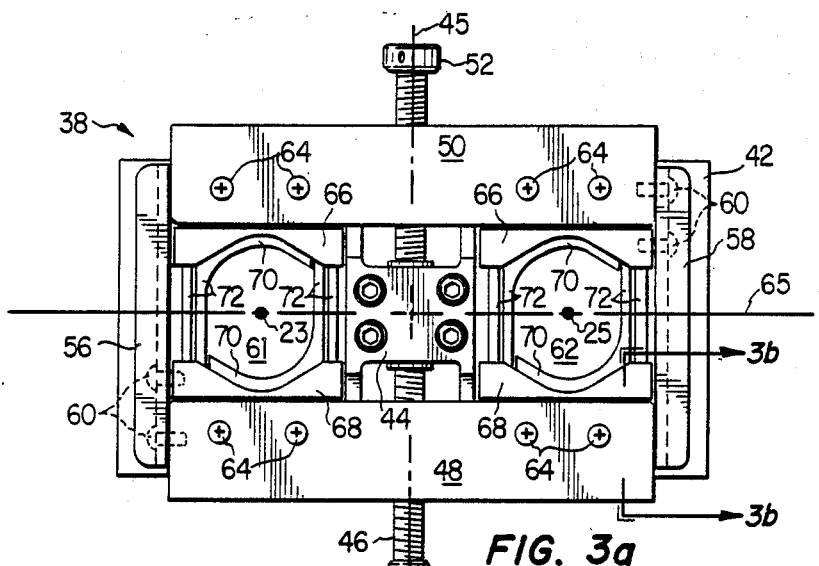
FIGURE 3a is a plan view of the preferred embodiment of the present invention.
Figure 3B:
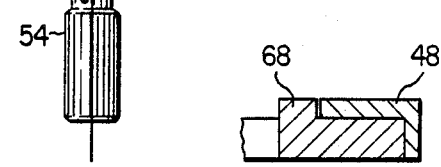

Referring to FIG. 3a the universal adapter 38 is shown in plan view in detail. The adapter 38 comprises a base plate 42 which is dimensioned to fit over the collimation receptacles 24 as will be subsequently described in more detail. Fixed to support plate 42 is a bearing housing 44. Supported by and rotationally passing through bearing housing 44 along a transverse axis 45 is threaded rod 46. Threaded rod 46 is threaded into first and second generally L-shaped (FIG. 3b) parallel bars 48 and 50. The threads on rod 46 are right hand threads on one end and left hand threads on the other end to allow the parallel bars 48 and 50 to be brought together or pushed apart in unison by the turning of rod 46.

Rod 46 has a stop 52 and a turning knob 54 attached to opposite ends thereof. The stop 52 prevents overturning of the rod 46 which would result in removal of bar 50. Turning knob 54 provides a stop to prevent removal of bar 48 as well as a device for turning the rod 46.

Guides 56 and 58 are fixed to bar 48 and bar 50 respectively by any appropriate method such as set screws (shown as phantom lines 60). Guides 56 and 58 assist in holding the goggles 40 laterally within the universal adapter 38.

First and second adjustable clamps, generally identified by the reference numerals 61 and 62, respectively, are fixed to first and second bars 48 and 50 by any appropriate method, such as bolts 64. First and second clamps 61 and 62 are spaced apart along a common axis 65 which is perpendicular to and passes through optical axes 23 and 25 (shown on FIG. 3a as dots 23 and 25) a convenient distance corresponding to the Test Set Receptacles 24. First and second clamps 61 and 62 comprise two pairs of generally C-shaped slidably engageable clamp portions 66 and 68. Clamp portions 66 and 68 may comprise, for example, plastic or aluminum.

Clamp portions 66 and 68 further include flanges 70 and extensions 72. Flanges 70 and extensions 72 assist in holding an optical device from falling through the adapter openings until the clamping portions 66 and 68 are appropriately adjusted to tightly clamp the optical device in place for testing. Additionally, extensions 72 assist in guiding the sliding adjustment of clamp portions 66 and 68 as will be subsequently described in more detail.

Figure 4:
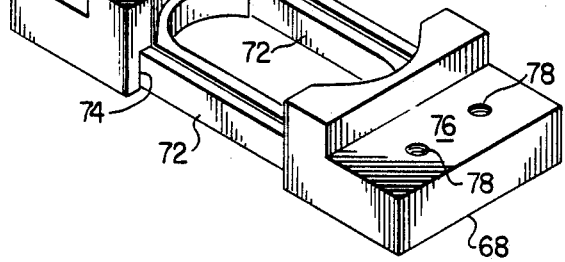
FIG. 4 is a perspective view of the clamp portions slidably engaged together.

Referring to FIG. 4, a perspective view of clamping portions 66 and 68 is provided. The extension 72 of one clamp portion 66 fits into receiving slot 74 of the other clamp portion 68. A recessed portion 76 is formed on each clamp portion 66 and 68 to cooperatingly fit with one or the other of L-shaped bars 48 and 50. Holes 78 pass through recessed portion 76 for insertion of bolts for attachment to the bars 48 or 50. Thus when bars 48 and 50 are brought closer together, clamping portions 66 and 68 slide together by the insertion of the extensions 72 into the slots 74.

In operation, an optical device is placed on the flanges 70 and extensions 72 of the clamps 61 and 62. The turning knob 54 is turned to rotate rod 46 in a direction to move parallel bars 48 and 50 closer together. As bars 48 and 50 move closer together, clamping portions 66 and 68 are also brought closer together equally about optical axes 23 and 25 until the optical device is securely gripped therein. The optical device may then be tested as required on the Test Set.

Figure 5:
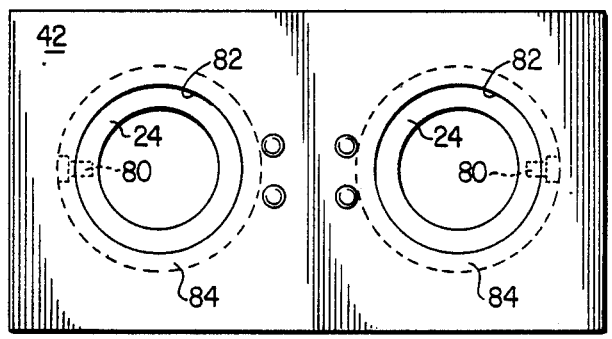
FIG. 5 is a plan view of the support plate of the present invention.

Referring to FIG. 5, the platform 42 is shown in plan view with all other components of adapter 38 removed. The platform 42 is provided with holes 82 passing therethrough for mounting to collimation receptacles 24. Platform 42 is placed on collimation receptacles 24 and removably fixed thereto by any appropriate method such as collars 84 which are fixed to platform 42. Set screws 80 which pass through collar 84 may be used to secure the platform 42 to the receptacle 24.

Although not shown, it is to be understood that an adapter utilizing the same principals as herein disclosed may be provided as a single clamp rather than as a double clamp device. In such a case, the single clamp would be used with a monocular device or in individual pairs for a binocular device.

Although the present invention has been described with respect to a specific embodiment thereof, various changes and modifications may be suggested to one skilled in the art, and it is intended that the present invention encompass such changes and modifications as fall within the scope of the appended claims.

What is claimed is:

1. A universal optical device adapter, comprising:
    an adjustable clamp comprising slidably interconnecting first and second clamping portions moveable together for clamping optical viewing equipment thereto;
    means for adjusting said clamping portions together for clamping the adapter to said viewing equipment, said means for adjusting comprising:
        a first bar fixedly connected to said first clamping portion;
        a second bar parallel to said first bar and fixedly connected to said second clamping portion; and
        a rotatable threaded rod interconnecting said first and second bars such that as such rod is rotated, said clamping portions are adjusted; and
    positioning means attached to said adjustable clamp and responsive to the movement of said adjusting means for bringing each of said clamping portions together uniformly about a stationary optical axis.

2. The adapter of claim 1, wherein said positioning means comprises a platform to which said adjustable clamp and said means for adjusting are slidably attached.

3. The adapter of claim 2, further including in combination an optical Test Set having optical test equipment and further including means for fixing said platform to said test set so that said clamping portions are aligned with said optical axis and said test set irrespective of any adjustment of said clamping portions.

4. A universal optical device adapter for use with an optical device test set, comprising:
    first and second adjustable clamps spaced apart a desired distance, said adjustable clamps comprising first clamping portions and second clamping portions slidably engageable with said first clamping portions;
    a bearing housing disposed between fixed optical axes;
    a rod passing through said bearing housing on a transverse axis and rotationally supported by said bearing housing, said rod having right hand threads on one end and left hand threads on another end;
    first and second parallel bars threadably attached to said threaded ends of said rod with said clamps and said bearing housing disposed therebetween, said first clamping portions affixed to said first parallel bar and said second clamping portions affixed to said second parallel bar, such that as said rod is rotated within said bearing housing, said parallel bars are moved to adjust said clamps; and
    means for positioning said clamps, said bearing housing, said rod and said first and second bars on the optical test set to allow an optical device to be secured in said adjustable clamps for testing.

5. The adapter of claim 4, wherein said first and second clamping portions are each generally C-shaped.

6. The adapter of claim 4, wherein said first and second adjustable clamps further include a flange for supporting said optical device thereon.

7. The adapter of claim 4, wherein said first and second adjustable clamps comprise plastic.

8. The adapter of claim 4, wherein said means for positioning comprises:
    a platform;
    holes passing through said platform to coincide with the device test set; and
    said bearing housing fixed to said platform to position said clamps over said holes such that when said optical device is clamped therein, said optical device may be tested by the test set.

9. A universal night vision goggle adapter for use with a Special Purpose Test Set, comprising:
    first and second parallel bars arranged symmetrically on either side of optical axes of the test set;
    a first pair of generally c-shaped clamping portions fixed to said first bar in a spaced relationship to each other and correspondingly centrally facing said optical axes;
    a second pair of generally c-shaped clamping portions fixed to said second bar in a spaced relationship to each other and symmetric to the first pair of clamping portions with respect to said optical axes and slidably engageable therewith;
    a bearing housing disposed between said first pair of clamping portions and said first and second parallel bars;
    a rod with right hand threads on one end and left hand threads on another end, said rod passing through and rotatably supported by said bearing housing, and threadably attached to said first and second parallel bars; and
    a platform having holes passing therethrough, said holes having axes coincident with said optical axes of the test set, said bearing housing being fixed to said platform in order to allow said rod to rotate within said housing to move said parallel bars and adjust each of said first and second pairs of clamping portions around a night vision goggle to allow testing thereof.

10. The adapter of claim 9, wherein said pairs of clamps further include radially inwardly directed flanges for supporting thereon said night vision goggle to be clamped therein.

11. The adapter of claim 9, wherein said rod further includes:
    an adjusting knob fixed on said one end; and
    a stop fixed on said other end in order to allow said rod to be rotated by turning said knob and prevented from exceeding a predetermined point by said stop and said knob.

12. A method for manufacturing an adapter for receiving an optical device to be tested on a test set, comprising the steps of:
    spacing a pair of adjustable clamps a desired distance apart along a common axis;
    attaching an adjusting portion to said pair of clamps, said adjusting portion interconnecting said clamps such that as said adjusting portion is engaged said clamps are cooperatingly adjusted about fixed optical axes; and
    fixing said adjusting portion to a platform dimensioned to fit onto the test set such that the optical device may be adapted to the test set by adjusting said clamps.

13. The method of claim 12, wherein the step of spacing further includes slidably engaging a first pair of clamping portions with a second pair of clamping portions.

14. The method of claim 13, wherein the step of attaching further comprises:
    fixing a first bar to said first pair of clamping portions;

fixing a second bar to said second pair of clamping portions; and interconnecting said first bar to said second bar by a rotatable threaded rod.

15. A method for clamping an optical device to optical test equipment, comprising the steps of:

fixing an optical device clamping fixture with respect to an optical axis of the test equipment;

positioning a pair of moveable clamp portions uniformly about said optical axis; and movably attaching said clamp portions together so that both said clamp portions move uniformly with respect to said optical axis.

16. The method of claim 15, further including fixing an adjusting rod with respect to said clamp portions so that rotation of the rod in one direction moves said clamp portions apart, and movement of said rod in an opposite direction moves said clamp portions together about said optical axis.

17. The method of claim 16, further including fixing two pairs of said clamp portions with respect to said adjusting rod so that movement thereof is effective to provide clamping of a binocular optical device in alignment with optical axes of the test equipment.

* * * * *